US005685997A

United States Patent [19]

LoPresti

[11] Patent Number: 5,685,997
[45] Date of Patent: Nov. 11, 1997

[54] PLASMA OSCILLATOR WATER HEATER/ STEAM BOILER

[76] Inventor: Daniel R. LoPresti, 243 Congress St., Portland, Me. 04101

[21] Appl. No.: 337,767

[22] Filed: Nov. 14, 1994

[51] Int. Cl.[6] .................... B23K 10/00

[52] U.S. Cl. .................... 219/121.59; 219/121.43; 219/121.36; 219/121.48; 373/18

[58] Field of Search .................... 219/121.59, 121.4, 219/121.43, 121.36, 121.48; 331/94.5; 376/103, 104, 152; 373/18.25

[56] References Cited

U.S. PATENT DOCUMENTS

| | | | |
|---|---|---|---|
| 3,605,038 | 9/1971 | Byrne et al. | 331/94.5 |
| 4,007,430 | 2/1977 | Fletcher et al. | 331/94.5 D |
| 4,448,743 | 5/1984 | Bass | 376/103 |
| 5,311,529 | 5/1994 | Hug | 372/35 |
| 5,459,771 | 10/1995 | Richardson et al. | 378/119 |

*Primary Examiner*—Mark H. Paschall
*Attorney, Agent, or Firm*—Stan Jones, Patents

[57] ABSTRACT

A plasma oscillator photonic energy water heater/steam boiler, establishes, amplifies and stores photonic energy in a plasma wherein resonance and temporary energy storage is maintained until energy is transferred on demand by thermal radiation and conduction of molecular kinetic energy to a heat exchanger having water to be heated therein. The chamber is a closed hollow internally reflective mirrored cylinder which includes parallel and optically resonant mirrored surfaces for sustaining a plasma oscillation within the container. A containerized molecular gas media is flooded with broad band electromagnetic radiation in order to create population inversions at the electron level in the gaseous atmosphere, and hence, store photonic energy in the plasma oscillator. Water in a heat exchanger immersed within the plasma is heated by thermal radiation energy transfer, and by conduction from a high molecular kinetic energy stored within the plasma.

30 Claims, 3 Drawing Sheets

PLASMA OSCILLATOR WATER HEATER/ STEAM BOILER

BACKGROUND OF THE INVENTION

1. Field of the Invention

The present invention is in the field of quantum physics and relates to a controlled method and apparatus for heating water and/or steam via electromagnetic and thermal radiation from quantized photonic emissions and high molecular kinetic energy within a plasma. The field of invention also relates to quantized photonic energy conversions and integrated heat transfer from high molecular kinetic energy by conduction from an oscillating plasma. This oscillating plasma is in heat exchanging proximity to thermally conductive heat exchangers for water/steam heating purposes.

More particularly, the field of this invention relates to a containerized gaseous atmosphere. A plasma, supported by such gaseous atmosphere, provides randomized continually excited photonic energy as a source of stored energy which is convertible to heat within a two-cavity optically resonant closed, mirrored system. Amplified molecular kinetic energy within the contained molecular gas also contributes to heating the water/steam by conduction.

2. Definition of Terms

Before discussing the prior art it is believed to be helpful to define some terms as used herein. These definitions will aid in a more complete understanding of the distinguishing features of this invention over the known prior art as described in the next section.

Plasma.

Plasma is defined for the invention as an amorphus collection of excited particles supported by a predefined and specified gaseous mixture. This plasma acts as a medium for energy conversion and storage from broad band electromagnetic radiation to narrow band thermal radiation in the infra red as well as a storage and transfer medium for molecular kinetic energy.

Plasma Oscillator.

Although an oscillator is usually synonymous with electrical and/or mechanical resonance, it's use in this invention is for energy storage as well. The term, plasma oscillator, for this invention is also used interchangeably with short term energy storage device. It stores molecular kinetic energy and photonic energy in a plasma and imparts both as heat to water/steam to be heated. Molecular kinetic energy is imparted by thermal conduction, and photonic energy is imparted by thermal radiation. Thus, this plasma oscillator stores quantized photonic energy in elevated electron states amplified by a pair of optically resonant mirror cavities, via sustained population inversions and amplified molecular kinetic energy present in the gaseous plasma medium.

Quantized Photonic Energy.

Quantized photonic energy is defined for this invention as the energy present in elevated electron states or population inversions within a contained gaseous media.

Gaseous Media.

The gaseous media which fuels the plasma oscillator is defined as a specific combination of carbon dioxide, nitrogen, and helium—which gaseous media provides electrons for population inversion as well as the molecules for molecular kinetic energy. The gaseous media is contained in a fixed volume and is controlled within specific pressure ranges.

Positive Feedback Optical Mirror Cavities.

A pair of positive feedback orthogonal optical mirror cavities are used in this invention. The optically resonant cavity formula for the invention is n times lambda=2L, where n is equal to any integer, L is a fixed length between mirrors, and lambda is wavelength. Such wavelength is expressed in centimeters as angstroms where 1 Å is equal to $10^{-8}$ cm, or it may be expressed in micrometers, where 1 µm is equal to $10^{-6}$m. These mirror cavities provide an optical "gain" for the plasma oscillator, which gain, in turn, yields a rather remarkable efficiency for this heater invention.

Operating Frequencies.

The energy transfer frequencies for this invention are in the thermal radiation spectrum and specifically range from about 0.1 to 100 µm. (Near infra red is equal to visible red to 5 µm and far infra red is from 5 µm to 100 µm.) This infra red frequency spectrum is of particular interest for the heating transfer principles of this invention.

Flooding The Chamber.

Flooding the chamber means to supply a broad frequency band of electromagnetic radiation into the plasma and thereby force population inversions within the plasma. As this electromagnetic radiation (photonic energy) enters into an environment of containerized gas, the electrons of the gas store energy through these population inversions.

Photonic Energy Absorption and Emission.

Quantum physics defines photonic energy absorption and emission in terms of the quantum state of the electron's orbit position. A series of elevated orbits relates to the electron's energy and serves as a temporary energy storage. The elevated energy levels or population inversions of the electrons also contribute to the molecular kinetic energy of the plasma. For electrons to ascend to a higher orbit they must absorb photonic energy and will release photonic energy in the form of narrow band infra red thermal radiation when returning to the original ground state. The elevated electrons will always seek a ground state or lowest orbit. An important fact to be noted is the ability of the plasma to absorb broad band photonic energy and release this energy in the narrow band infra red band as the electrons seek their ground state. (Please see the discussion of Population Inversion and Molecular Kinetic Energy, below.)

Population Inversion.

The phenomenon of population inversion is that state in a closed system where the number of electrons in a higher energy state is greater than the number of electrons in a lower energy state. When population inversion is achieved, there exists a temporary storage of a quantized amount of photonic energy. A continual transfer of photonic energy, in the form of electromagnetic thermal radiation, occurs in relation to the electron cycle of shifting from a higher orbit and then to a lower orbit. When the electrons reach their lowest valence state, this release of photonic energy stops. Quantized photonic energy (although absorbed from a broad spectrum of electromagnetic radiation such as, provided, for example, from a halogen bulb, or other suitable source) is released under the laws of quantum physics as electromagnetic thermal radiation only in the narrow band infra red frequency range. Such infra red radiant energy is readily absorbed by thermally conductive materials such as copper pipes, black bodies, and the like.

Oscillation Cycle of Electron Orbits.

Electrons in the plasma move through a cycle of ascending to a higher orbit and then falling back to it's original orbit or so-called ground state. The electrons in the outer orbit of atoms, have an ability to gain energy and emit/release energy in relation to their ascendance and fall to a higher and then lower orbit Molecular Kinetic Energy.

In lay person terms the increased molecular kinetic energy results from friction between molecules. This frictional energy is further defined by the laws of thermodynamics in a closed system. These laws being governed by the classic equation of PV=nRT, (where T is temperature and is the desired variable for my invention). In this closed system, keeping volume constant and using the equation PV=nRT, the relation of average molecular kinetic energy can be related to temperature. P=pressure; V=volume; n=number of moles of gas; R=ideal gas constant and T=temperature. With the cylinder volume constant, the equation PV=nRT shows that temperature is directly proportional to pressure. So as pressure increases the temperature of the gas increases.

Heating Water/Steam by Thermal Radiation and Conduction.

As broad band electromagnetic radiation floods into the plasma oscillator chamber and the electrons are raised to a higher energy state, the molecules also gain kinetic energy from the increased activity. An increase of molecular kinetic energy increases the agitation of the molecules and that increased agitation inside the closed system causes an increase in pressure. Increased pressure, in turn, is directly related to an increase in temperature. This molecular kinetic energy plus the photonic energy form an oscillating plasma inside the total reflective closed system, which plasma transfers heat to heat exchangers that are located in heat-exchanging proximity with the oscillating plasma. Thus, heat transfer occurs by thermal conduction and by electromagnetic thermal radiation.

DESCRIPTION OF THE PRIOR ART

Prior to this invention, hot water/steam has been generated by energy conversion methods ranging from fired heat to resistive electrical energy, to solar radiation and to even lasers fired directly at water or a water related apparatus. Although these various techniques certainly create hot water, they each also have marked disadvantages.

Generally speaking, the common hot water heater of today, whether gas, oil or electrically powered, exposes critical operating mechanisms to the corrosive affects of the water being heated. For example, resistive electric rods are immersed in water in order to create heated water. And such rods corrode. Additionally, these standard hot water heating approaches, as a general rule, are not very efficient. Accordingly, the cost of operation, maintenance and upkeep remains high.

A prior art search was done relating to this invention. The inventive technique of completely containing an oscillating plasma and controlling "randomized" lasing for thermal heat extraction is novel over the known prior art as revealed by the search. Heat extraction from a combination of electromagnetic thermal radiation and conduction from the increased molecular kinetic energy is not taught or suggested by the prior art. Moreover, a highly efficient heat transfer and regulator apparatus, in combination with a contained gaseous media and plasma oscillator which controls population inversions of electrons from which heated water/steam is derived, is not suggested by any known prior art.

Two of the closest prior art patents, Hunt and Heath are described in some detail below. These two specific prior art patents have been selected for discussion because they are believed to be representative of the general state of the applicable art as it existed prior to this novel and important invention. Such patents rely upon laser beams, but do not teach or suggest heat transfer from a contained oscillating plasma heating water/steam from two interactive high energy states provided by thermal radiation from photonic energy and by high molecular kinetic energy plus conduction from the contained elevated temperatures within the gaseous media.

Some of the additional patents turned up by the search include U.S. Pat. No. : 5,094,758, to Chang issued Mar. 10, 1992; U.S. Pat. No. 4,200,669 to Schaefer et al issued Apr. 29, 1980; U.S. Pat No. 4,337,759 to Popovich et al issued on Jul. 6, 1982; 4,042,334 to Matovich issued Aug. 16, 1977; U.S. Pat. No. 3,458,140 to Schryver, issued Jul. 29, 1969. Other patents include U.S. Pat. Nos. 3,813,514, 4,644,169, 3,977,198, 4,399,657, 4,02,880. Foreign art includes German DE 4008574; DE 4008575; Canadian 1,069,323; and EP 551546. These additional patents do not materially contribute to, or advance, the state of the art over Hunt and Heath Thus, they are cited for completeness sake only.

The first patent to be discussed in some detail is U.S. Pat. No. 4,644,169 to Hunt issued on Feb. 17, 1987. Hunt discloses a collimated laser beam of focused energy to apply heat to liquids through a conical laser beam receiving transducer. FIG. 1 of Hunt shows a requirement of several distinct serial energy conversion steps. Thus, Hunt first creates a laser beam of collimated energy, which energy, by definition, is represented by a narrow frequency band. Then the narrow frequency beam is directed to an object or surface to heat that surface. Finally, the heat is transferred by conduction from a heated surface that has been struck by the beam to another medium such as water in a pipe. There is no suggestion in Hunt of a randomized plasma and amplified kinetic energy oscillations in one water/steam heating container.

The second search patent, U.S. Pat. No. 4,658,115 to Heath, issued on Apr. 14, 1987 and depicts a laser directed at water itself inside a boiler. In Heath's approach, there is no ability to store radiant energy at quantum levels. Also, as was true in the case of the Hunt disclosure, there are extra energy conversion steps. Each extra step, of course, causes associated energy losses and demands attendant complexity in the apparatus.

By comparison, the plasma oscillator water heater of this invention requires fewer energy conversion steps. The novel plasma oscillator water heater has the advantage of a markedly higher efficiency in that it functions at the quantum physics level by elevating states as a temporary energy storage media before converting to heat thereby totally eliminating any need to create, direct, and/or focus a collimated narrow frequency laser beam.

This novel plasma oscillator water heater invention transfers heat to water without the efficiency losses associated with the prior art use of lasers. Higher efficiency, simpler operation and a reduced exposure of any operational parts to corrosive nature of water being heated is provided by the invention. Additionally, of course, the prior art requirements/apparatus for creating, focusing and transmitting a laser beam are totally eliminated.

Although the general state of the art does not permit an exact specification of the invention's energy efficiency it is safe to say it is dramatically more efficient. Based upon reasoned scientific and mathematical analysis, the invention is not only more efficient but it solves a long standing problem of the prior art in a simple and straightforward method and apparatus.

SUMMARY OF THE INVENTION

The invention is a plasma oscillator relying on photonic energy and molecular kinetic energy to heat water and/or steam. The oscillator establishes optical resonance within a pair of transverse optical mirror cavities. Resonance and temporary energy storage is maintained in the plasma until energy is transferred on demand by thermal radiation and conduction to a heat exchanger having water/steam to be heated therein. Water/steam in the exchanger is heated by a traditional thermal energy transfer by thermal radiation and conduction of both high molecular kinetic energy and stored photonic energy as provided by the plasma oscillator.

Stored photonic energy is released from the plasma in the form of narrow band infra band infra red energy as higher orbit electrons fall back from a high energy state to a lower state, thus releasing energy, which released energy is absorbed by a heat exchanger means immersed in (or in close proximity to) the contained plasma. Such population inversions, in turn, increase the amount of molecular kinetic energy available for use in creating heat for water/steam by conduction in the heat exchanging means.

The plasma oscillator may preferably take the shape of a closed hollow cylinder which includes a pair of reflective optical mirror chambers which are designed to be optically resonant and capable of sustaining contained photonic and molecular kinetic energy for useful work. A containerized molecular gas, flooded with a broad band of electromagnetic radiation and positive feedback from the mirrored optical cavities, optimize both molecular kinetic energy activity and photonic energy via population inversions in the contained gaseous atmosphere.

In the invention elevated photonic energy is transferred into useful work i.e. steam and/or hot water, via thermal radiation (infra red) to a heat exchanger as elevated photonic energy decays in a controlled fashion at the infra red wave lengths. Molecular kinetic energy is combined with such photonic energy for heating purposes. And, the attendant complexity and apparatus of the invention as compared to creating, focusing, and directing a prior art collimated laser beam is avoided by this invention.

In the plasma oscillator of the invention, the combination of photonic energy and molecular kinetic energy compliment and interact with each other in storing and amplifying the energy in the plasma oscillator. Located within the chamber are two optically resonant mirror cavities that exhibit positive feedback and promote a cascading growth of population inversions. Such feedback keeps the gas electrons in a continual state of population inversions and in turn contributes to a high state of molecular kinetic energy. This novel combination of oscillating photonic energy and an amplified state of molecular kinetic energy that forms within the oscillating plasma that is transferred into useful work to heat water and/or steam.

DESCRIPTION OF PREFERRED EMBODIMENT (S)

Figure 1:
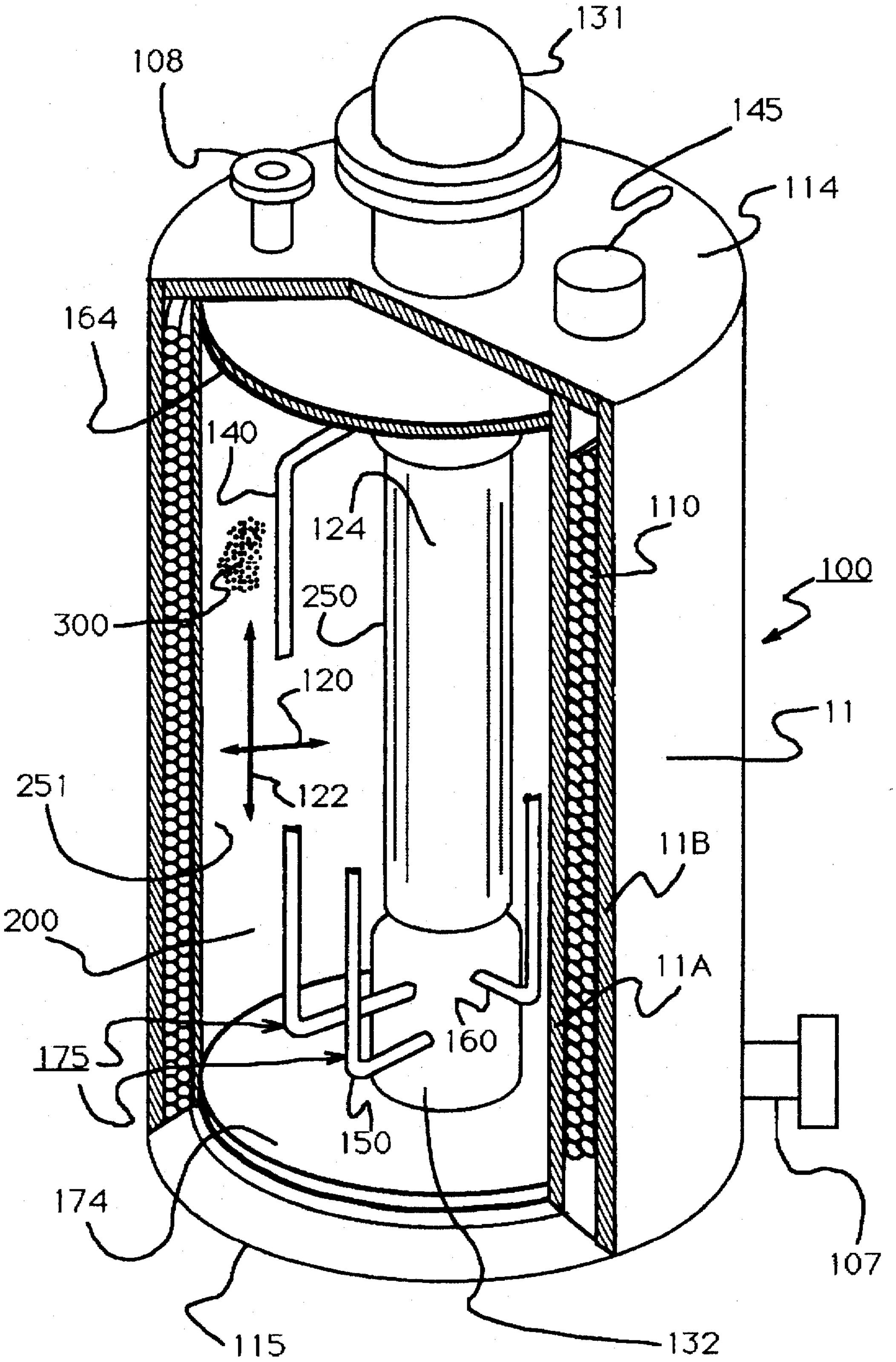
FIG. 1 shows a schematic functional diagram in a partial perspective view of a plasma oscillator water heater of this invention.

Turning now to FIG. 1 a water heater unit 100 is shown. For illustrative purposes, unit 100 is partially cut away in FIG. 1 so that the interior components are clearly presented. A hollow double-walled cylinder 11 includes circular coils 110, which coils surround an inner cylinder 11A and are located between inner cylinder 11A and an outer cylinder 11B. Circular coils, or pipes, 110 may preferably be a continuous length of copper water tubing. These pipes 110 carry water/steam which is heated by the principles of this new and novel water heater 100.

Water for heater 100 comes in at inlet port 107 and exits in a heated state at outlet port 108. The inlet 107 enters through drum, or reservoir, 132 and outlet port 108 is interconnected internally through the top drum 131 and exits unit 100 through top plate 114. Quite clearly, however, other inlet and outlet configurations such as through the inner or surrounding water coils may just as easily be provided and are clearly within the scope and principles of the invention.

Closing the upper end of cylinder 11 is a sealed top 114. At the other and lower end of cylinder 11 is a sealed bottom 115. Both top 114 and bottom 115 may be any suitable material capable of being sealed to a sufficiently high degree that a vacuum may be initially established to deter contamination of the inner chamber 200. This vacuum is then replaced with a specific predetermined gaseous media which is contained by cylinder 11 and end plates 114 and 115. Cylinder 11, for example, will withstand a partial vacuum of about 15 Torr (0.59 inches of Hg.). The vacuum within cylinder 11 is interjected with and filled by a mixed inert gas that is used to form a plasma 300.

Centrally located in the center of top plate 114 and bottom plate 115 are an upper water/steam reservoir drum 131 and a lower reservoir drum 132, respectively. These reservoir drums 131, 132 are also sealed in suitable openings respectively located axially at the plate centers for sealably mating with top plate 114 and bottom plate 115. Between the innermost ends of drums 131 and 132 is a cylindrical mirror 250.

A series of pipes 140, 150, 160, etc. are positioned as water/steam conduits between the upper and lower reservoirs 131 and 132. These pipes 140, 150 160, etc. conduct water/steam between reservoirs 131 and 132 and collectively serve as a heat exchanger 175, FIG. 2. The pipes of exchanger 175 locate water to be heated in heat exchange positions relative to plasma 300.

The number of water pipes shown in FIG. 1 is illustrative only. These internal pipes of exchanger 175, and pipes 110 surrounding the cylinder 11, form two different types of heat exchangers. Cavity 200 includes a pair of transverse optically resonant paths 120 and 122. Exchanger 175 is thus directly immersed in plasma 300. Although shown symbolically by a locus of dots, the oscillating plasma 300, it should be understood, fills the entire cavity 200 of cylinder 11. Water circulating in this exchanger 175 is heated by the photonic and molecular kinetic energy transferred from plasma 300 to the water in exchanger 175.

Mirrored surfaces 250, 251 may be supported by, or plated on, an innermost center cylinder 124 and the inner surface of cylinder 11A, respectively. The center cylinder 124 is centrally located and axially aligned with the innermost ends of drums 131 and 132. The primary purpose of inner cylinder 124 is to provide, on an outward facing surface, a mirrored cylindrical face 250. Mirrored cylindrical surface 250 is thus positioned within another larger cylindrical mirrored surface 251 as defined by the innermost and inwardly-facing surface of cylinder 11A.

In FIG. 1, a central section of exchanger 175 is shown broken away in order to more clearly represent the orthogonal optical paths labeled by double-headed arrows 120 and 122. Optical resonance is between the radial parallel mirrored surfaces 250 and 251. The inward facing surface of top 114 is mirrored or contains another mirror 164. Likewise, bottom 115 is mirrored or contains a mirror 174. The space between mirrors 164 and 174 forms another optically resonant path. Thus, the optical resonant paths 120 and 122 are both radial in the horizontal (path 120) and vertical (path 122).

Figure 2:
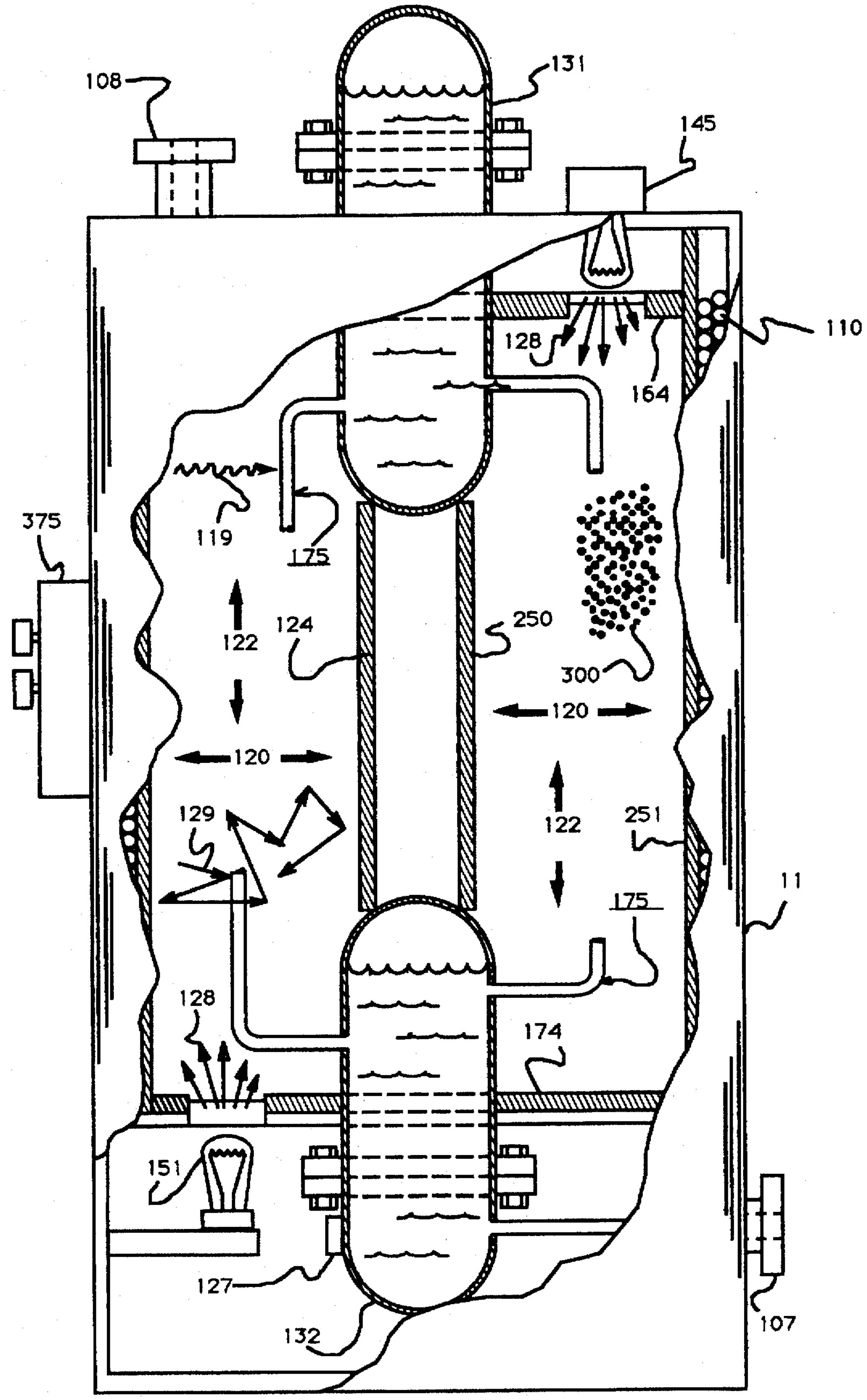
FIG. 2 shows a partially cut-away view of the apparatus and method of the plasma oscillator and includes mirrored surfaces and a heat exchanger for implementing the water/steam heater principles of this invention.

Electromagnetic radiation 128, FIG. 2, is both a control and a source of input energy into the gaseous interior of heater 100. FIG. 2, for example, depicts such electromagnetic radiation as coming from halogen lamps 145 and 151. These and other lamps are controlled by a regulator control 375, FIG. 3. Several lamps may be controlled by a control regulator 375 in order to sufficiently flood the gaseous chamber with broad band electromagnetic radiation. Under controlled operation, a broad band of optically radiant energy is admitted into chamber 200 by these halogen lamps 145 and 151.

Energy stored in plasma 300 is controlled to heat the water in the heat exchanger 175 to a temperature of between about 160 and 180 degrees for a first water temperature zone. This invention readily provides for another water temperature zone between cylinders 11A and 11B. In any event, water once heated will remain in a heated condition until hot water is drawn away by a user. As the user withdraws heated water, an energy loss in plasma 300 will be replaced on demand by more electromagnetic radiation from the halogen lamps 145 and 151. This operational cycle will again temporarily restore the photonic energy in plasma 300 to an appropriate excess level over and above a predetermined energy storage level for heat transfer on demand.

Having described the basic structure of this invention, it is believed helpful to summarize the operation at this point. The cooperation of the components of FIGS. 1 and 2 form a closed total internally reflective mirror chamber into which a suitable inert gaseous media is admitted. That gaseous media may be a specific combination of carbon dioxide, nitrogen, and helium. This gaseous media provides electrons for population inversion as well as the molecules for molecular kinetic energy. The gaseous media is contained in a fixed volume and is controlled within specific pressure ranges.

When the gaseous media is flooded with broad band electromagnetic radiation, the plasma is initialized. Electrons are supplied by the molecules of the gaseous media. At this point the interjected start up energy is stored in quantized population inversions of electrons at their elevated states. This increased molecular activity creates a by-product of molecular kinetic energy 129, FIG. 2. Arrows 129 are symbolic of this molecular friction. Thus, there exists a mass energy storage condition as defined only by the laws of quantum physics.

Having established this mass energy storage condition, let us look at what happens when a user desires hot water from the heater. Available to that user is a quantized amount of extractible energy represented by these elevated states of the population inversions, which energy may then be drawn upon instantaneously. As the user draws hot water, energy is transferred from these elevated states in the form of electromagnetic thermal radiation to the heat exchangers. This electromagnetic thermal radiation is depicted by the wavy arrow 119 impinging upon heat exchanger 175.

A near instantaneous energy conversion occurs as the electrons fall to their ground state and release narrow band thermal radiation 119 which impinges upon the heat exchanger. Heat transfer takes place at the speed of light as the elevated states fall upon user demand. The available energy provided by this invention is thus stored without the traditional thermal energy losses associated with the prior art.

The storage of photonic energy in oscillations is best regulated when stored photonic energy in the plasma is high with respect to demand. A ratio of plasma storage to demand is in the order of a factor of 10. Stated otherwise, the internal heat exchangers should only absorb about ten per cent (10%) of the photonic or molecular kinetic energy from plasma oscillations before replenishment by lamps 145 and 151 via regulator control 375. This 10 to 1 ratio will maintain a continuous supply of plasma oscillations in the form of photonic energy and high molecular kinetic energy.

As radiant energy from the plasma oscillations is absorbed through the internal heat exchanger, energy oscillations decrease and are replenished from halogen lamps 145, 151. This replenishment of elevated photonic energy to a desired level in the plasma oscillator helps maintain a continual supply of photonic and amplified molecular kinetic energy for thermal radiation and conductive absorption through the internal heat exchangers.

Now the regulator control 375 of FIG. 3 will be described. During a start-up sequence broad band electromagnetic radiation is flooded into the mirrored internal chamber 200. Electrical control circuit 375, FIG. 2, establishes an "on" condition for the halogen lamp 151. Halogen lamp 151 emits electromagnetic radiation 128, FIG. 2.

Once sustained population inversions have been created in these positive feedback mirror cavities, control circuit 375 will thereafter controllably interrupt the energizing of the halogen lamp 151 based upon a demand sequence. The control for a user-initiated demand sequence will now be described.

Figure 3:
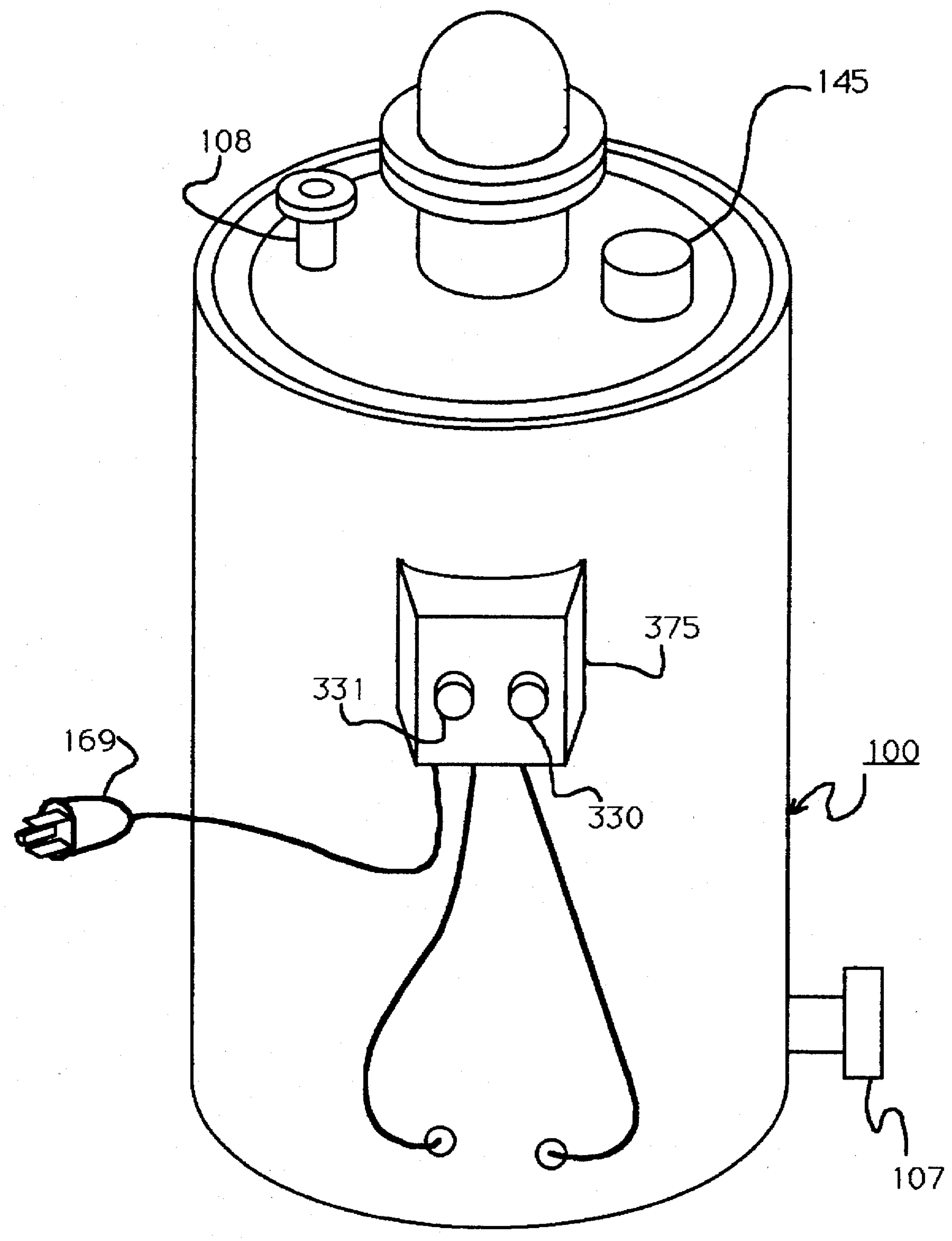
FIG. 3 shows a water heater of this invention provided with electrical connections for a typical regulator control circuit and water access ports.

FIG. 3 depicts a typical way that the halogen lamps 145, 151 are controlled as hot water is withdrawn by a user. In FIG. 3, electrical control current is supplied by a typical plug 169 and associated electrical wiring as shown and understood in the various figures without additional description being necessary.

Hot water heater 100 includes a control regulator 375. This control unit is provided with a pair of potentiometer knobs 330, 331 for setting the desired temperature in separate water temperature zones. A pair of knobs, one each for each heating zone, is provided in order to establish two separate zone controls. These zone controls may be configured in series, parallel or series/parallel. These several configurations provide variations, as are well known, for temperature and flow controls. Such temperature and flow control systems are well known and are readily available in the art. Accordingly, no further description is warranted.

One heating zone may be set for normal hot water, and is controlled to regulate water heat at a temperature in the range of about 115 to about 125 degrees Fahrenheit (115 to 125 F.). Another zone is for higher temperature usage and heats water to a temperature of about 160 to about 180 F. Clearly, the principles of this invention are equally applicable for steam and/or a single water temperature zone.

As an example of the arrangement for a two zone hot water heater, the outside coils 110, FIG. 1, may be in a lower temperature heating zone while the inside heat exchanger 175 may be a second and higher temperature zone. In any event, however, the temperature regulator 375 requires setting the potentiometer knobs 330, 331 such that they will control the "on" and "off" duty cycle for a series of halogen lamps 145, 151.

In the diagram of FIG. 2, incoming water to be heated is supplied at inlet port 107 and the temperature of that water is sensed by a thermistor 127, FIG. 2. Thermistor 127, in standard fashion, has a resistance range that varies with the temperature variations being sensed. For cold water, the thermistor will allow a relay or other control device to keep the halogen lamps 145, 151 of FIG. 2 in an "on" condition for a suitable duration to flood the chamber 200. Thereafter, the thermistor changes resistance in accordance with changes in water temperature being sensed.

Thermistor 127 in conjunction with potentiometer 330, 331 FIG. 3, provides the necessary operator controls. Energizing the lamps 145, 151 floods the chamber until control regulator 375, FIG. 2, senses the higher temperature setting. A similar circuit operation controls the other water heating zone. Temperature changes in the water thus accommodate a predetermined control range for water heating within a given upper and lower temperature value for either single or multiple water heating zones.

While various changes may be made in the detailed construction, it shall be understood that such changes will be within the spirit and scope of the present invention as defined by the appended claims.

What is claimed is:

1. A water/steam heating apparatus which stores energy in a plasma oscillator within a mixed inert gas in an optically resonant mirrored container having water to be heated by a heat exchanger, said apparatus comprising:

means including a broad band source of electromagnetic energy for forming a randomized oscillating plasma within said container, said plasma including complimenting non-coherent energy sources of quantized photonic energy and molecular kinetic energy;

an optically resonant mirror means located within said container for storing said two complimenting non-coherent energy sources in said oscillating plasma, which complimenting sources of energy may be extracted by said heat exchanger to heat water/steam; and heat exchanging means, at least a part of which is immersed within said plasma, for bringing said water/steam into a thermal radiation exchange and a molecular kinetic conductive relationship for heating said water from both said quantized photonic energy and from said molecular kinetic energy.

2. A water/steam heating apparatus in accordance with claim 1 wherein said oscillating plasma maintains a continual cycle of electron population inversions and narrow band thermal infra red energy release and said optically resonant mirror means further comprises:

positive feedback reflective mirror surfaces in said container for controllably maintaining said electron population inversions in said oscillating plasma as heated water is drawn away from said water heating apparatus.

3. A water/steam heating apparatus in accordance with claim 2 wherein said positive feedback means comprises:

a pair of parallel mirrored reflective optically resonant surfaces for reflecting thermal radiant energy back and forth between said mirrored surfaces.

4. A water/steam heating apparatus in accordance with claim 1 wherein said heat exchanging means is further characterized by comprising:

means for first evacuating the container to a near absolute vacuum for a subsequent introduction of said mixed inert gaseous media without contamination.

5. A water/steam heating apparatus in accordance with claim 4 wherein said heat exchanging means is further characterized by comprising:

water/steam conduit means immersed in said oscillating plasma for withdrawing said photonic and kinetic energy from said oscillating plasma for water/steam heating purposes.

6. A water/steam heating apparatus in accordance with claim 4 wherein said heat exchanging means is further characterized by having at least two distinct sections, and said apparatus further comprises:

one section of said heat exchanging means being immersed in said oscillating plasma for energy transfer both by thermal radiation and molecular kinetic conduction; and a second section of said heat exchanging means encircling at least part of said container in a thermal exchange relationship with said contained energy of said oscillating plasma.

7. A water/steam heating apparatus in accordance with claim 1 and further comprising:

at least a pair of internally reflective mirrored surfaces for establishing positive feedback and amplification that sustains the energy level in the plasma oscillator.

8. An optically resonant oscillating plasma water/steam heater, comprising:

a gaseous media chamber having parallel internally mirrored surfaces;

at least one pair of transverse positive feedback optically resonant mirror cavities located within said chamber between said mirrored surfaces, with said transverse cavities establishing an oscillating plasma therebetween;

a source of broad band electromagnetic radiation for flooding said chamber;

a heat exchanging means immersed in the plasma in said chamber and having water to be heated therein, which water is isolated from physical contact with said plasma;

thermal radiation energy transfer means in said heat exchanger for transferring photonic energy from said oscillating plasma to said water; and a molecular kinetic conduction means for transferring molecular kinetic energy on demand from said plasma to said water in said heat exchanging means.

9. An optically resonant oscillating plasma water/steam heater in accordance with claim 8 wherein said thermal energy transfer means is further characterized by comprising;

a halogen lamp for emitting broad band electromagnetic radiation into said chamber;

said lamp creating in said resonant mirror cavities a phenomenon of population inversion which is that condition in quantum physics where the number of electrons in a higher orbit is greater than the number of electrons at a ground state or lower orbit and there exists a temporary storage of photonic energy in the form of an electron cycle of shifting to a higher orbit and then to a lower orbit; and said heat exchanging means further comprises means for releasing, under the laws of quantum physics caused by said electron shift to a lower orbit, only a narrow infra red band of thermal energy from said oscillating plasma.

10. An optically resonant oscillating plasma water/steam heater in accordance with claim 9 wherein said absorbing means in said heat exchanging means is further characterized by comprising;

a multiplicity of spaced water conduits positioned in said optically resonant cavities and heated by thermal radiation released in the form of infra red energy as the electron population inversion cycles occur.

11. An optically resonant oscillating plasma water/steam heater in accordance with claim 10 having a pair of water reservoirs and wherein said plasma apparatus is further characterized by comprising;

an upper water/steam drum located in an upper section of said chamber;

a lower water/steam drum located in a lower section of said chamber; and said multiplicity of spaced water conduits form a series of spaced parallel water/steam flow connections between said upper and lower water/steam drums for water heating purposes.

12. An optically resonant oscillating plasma water heater in accordance with claim 8 wherein said chamber may preferably take the shape of a closed hollow cylinder, said cylinder further comprising:

a molecular gaseous mixture sealably containerized as a gaseous atmosphere in said cylinder;

said first pair of optically resonant reflective chambers located at the upper and lower ends of said closed hollow cylinder; and said electromagnetically radiant energy source comprises means for flooding into said optically reflective cavities a broadband of electromagnetic radiation in order to optimize and sustain population inversions in said gaseous atmosphere, and hence, store photonic energy and amplify molecular kinetic energy in said oscillating plasma.

13. An optically resonant oscillating plasma water heater in accordance with claim 12 wherein said chamber further comprises:

a top piece sealed at one end of said closed hollow cylinder;

a bottom piece also sealed at the other end of said cylinder, said seals capable of containing a vacuum for initialization and pressure during operation; and mirror surfaces on each of said upper and lower ends.

14. An optically resonant oscillating plasma water heater in accordance with claim 12 wherein said chamber further comprises:

a smaller inner cylinder centrally located within the outer cylinder and sealed therewith; and a second pair of mirror surfaces, with one mirror surface of said second pair located on the inward facing surface of the outer cylinder and a second mirror surface of said second pair located on the outward facing surface of the inner cylinder.

15. An optically resonant oscillating plasma water heater in accordance with claim 12 wherein said radiant energy source includes a halogen lamp and said apparatus further comprises:

a regulating means connected to said halogen lamp and responsive as energy is withdrawn in the form of heated water from said cylinder for controlling an on/off duty cycle for said halogen lamp.

16. An optically resonant oscillating plasma water heater in accordance with claim 15 wherein said regulating means further comprises:

an electrical control circuit; and means sensing a drop in water temperature and operative in response thereto for momentarily turning on said halogen lamp.

17. An optically resonant oscillating plasma water heater in accordance with claim 8 wherein said resonant chamber further comprises:

at least a pair of resonant mirror cavities positioned within said cylinder and having parallel surfaces facing each other for optical resonance and positive feedback that establishes said plasma in said cavity between said mirror surfaces.

18. An optically resonant oscillating plasma water heater in accordance with claim 16 wherein said control circuit further comprises:

water temperature sensing means for detecting water temperature in a water outlet location.

19. An optically resonant oscillating plasma water heater in accordance with claim 18 wherein said control circuit further comprises:

a temperature setting controller having an output circuit connected to said halogen lamp; and said sensing means feeds an output signal indicative of the sensed water temperature for controlling the on/off duty cycle for said halogen lamp.

20. A method of heating water from a reservoir of extractable energy stored in an optically resonant mirror chamber at the molecular and quantum level, said method comprising the steps of:

forming plasma oscillations within a mixed inert gas contained in a vacuum within an internal reflective optically resonant mirror chamber;

storing said extractable energy in resonance forming said oscillating plasma, which energy may be extracted as heat;

establishing, from said oscillating plasma, a thermal radiation energy transfer and molecular kinetic conduction energy transfer for water to be heated;

withdrawing said extractable energy from the reservoir of said oscillating plasma; and imparting the withdrawn energy as heat delivered to water circulating through said chamber.

21. A method of heating water from a reservoir of extractable energy in accordance with claim 20 wherein the step of storing extractable energy in resonance includes the additional steps of;

controlled regeneration of said oscillating plasma by positive feedback with reflected quantized photonic energy; and heating water by thermal radiation energy transfer with said extracted quantized photonic energy.

22. A method of heating water from a reservoir of extractable energy in accordance with claim 20 wherein the step of storing extractable energy in resonance includes the additional step of:

controlled regeneration of said oscillating plasma with amplified molecular kinetic energy; and heating water by conduction energy transfer with said extracted molecular kinetic energy.

23. A method of heating water from a reservoir of extractable energy in accordance with claim 20 wherein the step of storing extractable energy in resonance includes the additional step of:

extracting from a reservoir of said oscillating plasma in resonance, molecular kinetic energy and quantized photonic energy.

24. A method of heating water from a reservoir of extractable energy in accordance with claim 20 wherein the step of storing said extractable energy in resonance includes the additional step of:

forming and regenerating a resonance between quantized photonic energy and molecular kinetic energy in said oscillating plasma; and imparting heat to the circulating water by heat exchanging means.

25. A method of heating water from extractable energy stored at the molecular and quantum level in an optical resonant mirror chamber, said method comprising the steps of:

vacuum injecting a mixed inert gaseous media within a optically resonant mirrored chamber;

forming plasma oscillations by use of mirrors containing the vacuum injected inert gas;

reflecting thermal radiant energy between said mirrors in said optically resonant chamber;

regenerating complimentary energy forms of photonic energy and molecular kinetic energy in resonance in said oscillating plasma;

storing said complimentary energy forms as extractable energy in said oscillating plasma, which energy is extractable as heat;

establishing a thermal radiation energy transfer and molecular kinetic conduction transfer for water to be heated; and withdrawing said extractable energy from said oscillating plasma; and imparting withdrawn energy as heat to said water.

26. A method of heating water from a reservoir of extractable energy in accordance with claim 20 wherein the step of storing extractable energy in resonance includes the additional steps of:

maintaining amplified quantized photonic energy in elevated quantum electron population inversion states, which states may, at will, be allowed to increase or decay along with a concurrent increase or decay of molecular kinetic energy.

27. A method of heating water from a reservoir of extractable energy in an optically resonant oscillating plasma water heater operating with the reflection of efficiency greater than absorption efficiency at the molecular and quantum level, said method comprising the steps of:

evacuating an optically resonant mirror chamber;

placing within said evacuated mirror chamber a known volume of an inert gaseous mixture capable of supplying an electron population for elevated quantum electron states and molecular kinetic energy;

causing quantized photonic energy and molecular kinetic energy to resonate between mirrors which constitute said optically resonant chamber; and heating water by energy extracted from said optically resonant chamber.

28. An optically resonant oscillating plasma water heating method in accordance with claim 27 and further comprising the steps of:

controllably entering broad band electromagnetic radiation into said chamber as a source of photonic energy and concurrently amplifying molecular kinetic energy within said chamber; and creating in said optically resonant mirrored chamber population inversion wherein the number of electrons in a higher orbit is greater than the number of electrons at ground state or a lower orbit and there exists a continual emission of photonic energy in a positive feedback relation to the electrons oscillation between a higher orbit and a lower orbit.

29. An optically resonant oscillating plasma water heating method in accordance with claim 27 and further characterized by comprising the steps of;

spacing a multiplicity of water conduits at equidistantly spaced positions in said cavity, for the controlled attenuation of oscillating plasma energy through said conduits to heat said water by electromagnetic thermal radiation released in the infrared frequency band as the energy of higher orbit electrons in said population inversion fall back to a lower state, thus releasing energy as such electron population inversions return to their ground state; and additionally heating water by conduction from said molecular kinetic energy to said water conduits.

30. An optically resonant oscillating plasma water heating method comprising the steps of:

storing energy in an optically resonant mirror chamber within said water heating apparatus;

containing an oscillating plasma of photonic energy and molecular kinetic energy in said optically resonant mirror chamber of said water heating apparatus;

controllably entering broad band electromagnetic radiation into said optically resonant mirror chamber for the purpose of regenerating the inversion of quantum electron states forming said plasma;

facilitating by positive feedback a faster rate of photonic energy due to the internal reflection efficiency being greater than the absorption efficiency which attenuates the plasma energy at a slower rate; and sustaining an oscillating plasma from which water heating energy may be extracted.

* * * * *